J. EATON.
MOTOR CONTROL.
APPLICATION FILED JUNE 18, 1917.
1,330,627.
Patented Feb. 10, 1920.
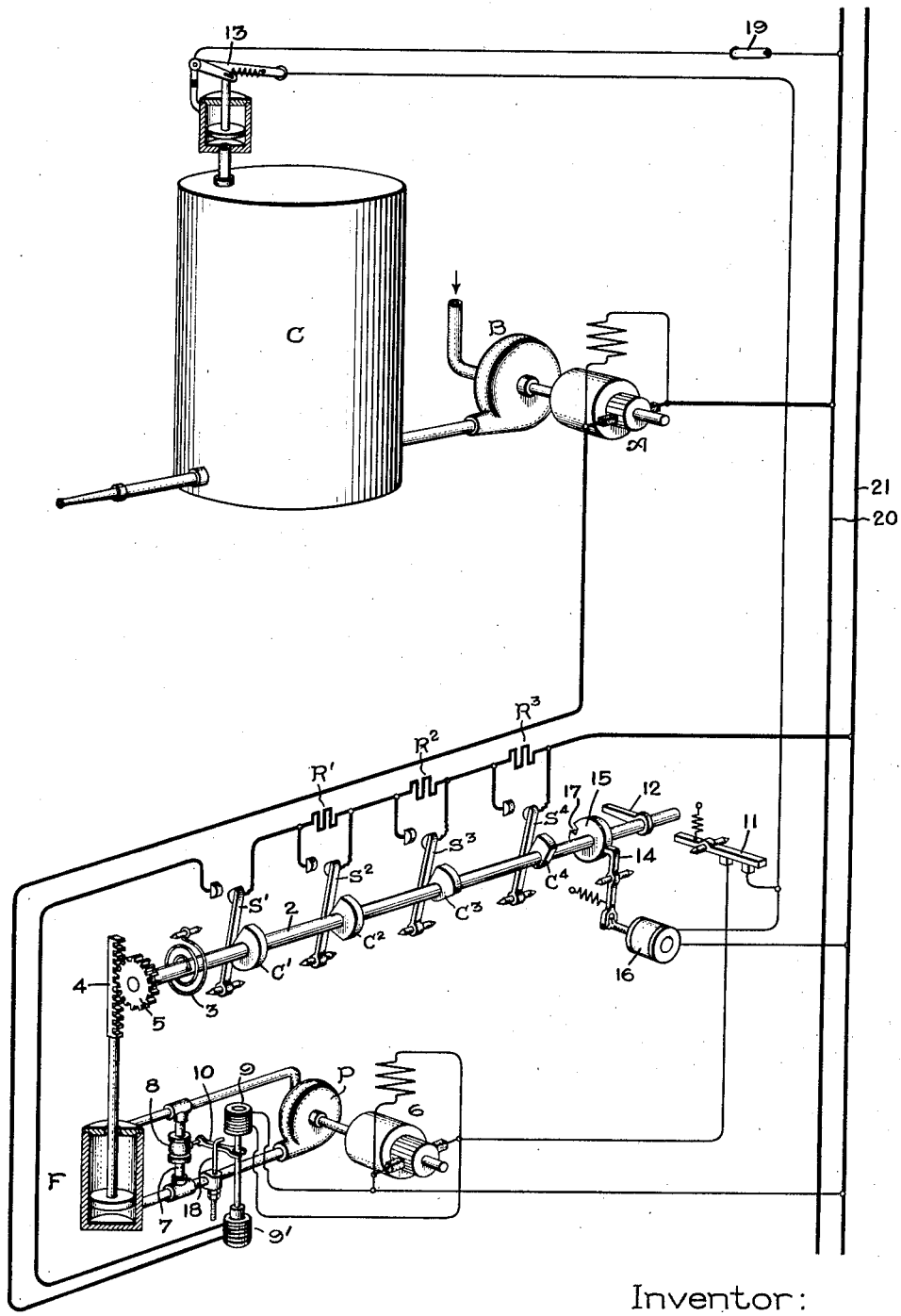
Inventor:
John Eaton,
by Albert G. Davis
His Attorney.

UNITED STATES PATENT OFFICE.

JOHN EATON, OF SCHENECTADY, NEW YORK, ASSIGNOR TO GENERAL ELECTRIC COMPANY, A CORPORATION OF NEW YORK.

MOTOR CONTROL.

1,330,627.  Specification of Letters Patent.  Patented Feb. 10, 1920.

Application filed June 18, 1917. Serial No. 175,315.

*To all whom it may concern:*

Be it known that I, JOHN EATON, subject of the King of Great Britain, residing at Schenectady, county of Schenectady, State of New York, have invented certain new and useful Improvements in Motor Control, of which the following is a specification.

My invention relates to the control of electric motors, and it provides improved means whereby the motors are started and stopped and generally controlled in a safe, reliable and effective manner.

More specifically, my invention relates to systems of motor control wherein a fluid motor is provided for operating the motor control switches, and it has for one of its objects the provision of improved means whereby the speed and direction of operation of the fluid motor are controlled so as to obtain an effective control of the electric motor.

In carrying my invention into effect, I provide an electric motor controller driven by a fluid motor which is operated by means of fluid under pressure supplied from any suitable source such as a pump driven by an electric motor. To control the speed and direction of operation of the fluid motor, I provide an operating fluid by-pass around the fluid motor and control this by-pass and the fluid under pressure by means of valve mechanism operated responsively to the operation of the switch mechanism, and in accordance with the work required of the electric motor to be controlled and the current taken by the motor during acceleration, thereby obtaining a motor control which is simplified in construction, positive and automatic in operation, and one which can be quickly and easily adjusted to give the desired operation of the controlled motor.

The novel features which I believe to be characteristic of my invention will be definitely indicated in the claims appended hereto. The features of construction, mode of operation and further objects of my invention will be understood by reference to the following description taken in connection with the accompanying drawing, wherein I have shown in simplified diagram an embodiment of my invention.

Referring to the drawing, the electric motor A is adapted to drive the pump B to supply water to the tank C of a fire protection sprinkler system for a building. The motor A is controlled by means of the separately actuated switches $S^1$, $S^2$, $S^3$, $S^4$, which are operated by means of the cams $C^1$, $C^2$, $C^3$, $C^4$, attached to the cam shaft 2 which is biased by means of the spring 3 to a position at which the switches $S^1$ to $S^4$ inclusive are permitted to open. The cam shaft is operated by the fluid motor F through a rack and pinion arrangement 4, 5. Fluid under pressure to operate the fluid motor F is supplied by means of the pump P which is driven by means of the electric motor 6. In a by-pass 7 around the cylinder of the fluid motor F there is provided a valve 8 which is controlled by means of the electromagnets 9 and 9'. A plunger on the electromagnet 9 is connected to the lever 10, and the arrangement is such that when the electromagnet is energized the lever 10 is drawn up and the valve 8 in the by-pass is closed, and when the electromagnet is deënergized the lever 10 is permitted to drop, thus opening the valve. The electromagnet 9 is energized responsively to the operation of the cam shaft 2 by means of the switch 11 which is biased to the closed position and moved to the open position against its bias by means of the trigger 12 on the cam shaft when this shaft has been moved by the fluid motor to the position where the last switch ($S^4$) has been closed. The electromagnet is likewise energized responsively to the work required of the electric motor A by means of the float operated switch 13, the arrangement being such that when the height of the water in the tank C has reached the predetermined level, the switch 13 will be moved to the open position, thereby deënergizing the electromagnet 9 and the electric motor 6 which drives the pump P. The electromagnet 9' is energized responsively to the current taken by the motor A, its plunger being mechanically connected to the plunger of electromagnet 9 and so arranged that when the current taken by motor A is greater than a predetermined amount during acceleration, as for instance the switches $S^2$ to $S^4$ are being closed too rapidly or for any other reason, the electromagnet 9' will exert a pull sufficient to overcome the electromagnet 9 and open the valve 8, thus arresting the cutting out of the starting resistance until the motor current has dropped. When the cam shaft has been moved to the position where the switch S⁴ is closed, the detent 14, which is held against its bias in engagement with the disk 15 on the cam shaft by means of the electromagnet 16, drops into the notch 17 and holds the cam shaft until the detent 14 is released by the deënergization of magnet 16 in response to the opening of float switch 13. When the detent is released the cam shaft is moved counter-clockwise to open the cam switches by the spring 3.

The adjustable stop 18 is provided to vary the speed of the reciprocating fluid motor F, the arrangement being such that when the electromagnet 9 is energized to close the valve 8 in the by-pass, the stop 18 will prevent the valve from completely closing, thereby permitting a small amount of operating fluid to be shunted from the fluid motor through this valve, thus regulating the speed of the fluid motor and the control of the main motor A. When the electromagnet 9 is deënergized, the valve 8 is permitted to drop open by gravity, thus permitting the fluid pressures on both sides of the fluid motor piston to be neutralized and allowing the piston to be moved to the lower position in response to the action of the spring 3 on the cam shaft.

As thus constructed and arranged, the operation of my invention is as follows:

Assuming that the pilot switch 19 is closed as shown on the drawing, the electromagnet 16 is energized to move the detent 14 into engagement with the disk 15 on the cam shaft and the motor 6 is energized to operate the pump P to create a pressure of the operating fluid on the lower surface on the piston of the fluid motor. At the same time, the electromagnet 9 is energized to close the valve 8 in the by-pass 7 to the extent determined by the setting of the adjusting device 18. The piston of the fluid motor will be thereby caused to move upward at a speed determined by the setting of the adjustment device 18 and the current limit throttle electromagnet 9', and the cam shaft 2 will be moved clockwise against the bias of the spring 3 to cause the cams C¹ to C⁴ inclusive to close the switches S¹ to S⁴ inclusive, successively. The closing of the switch S¹ energizes the motor A across the source of supply 20, 21, in series with the starting resistances R¹, R², R³ and the switches S², S³ and S⁴ short circuit these starting resistances in succession. In case the resistances are being cut out too fast or for any other reason the current taken by motor A exceeds the predetermined amount, the electromagnet 9' will open the valve 8 and permit the operating fluid to be by-passed around the fluid motor and thus arrest the cutting out of the resistances until the motor current has dropped below that value. When the piston of the fluid motor has been moved upward until the last switch S⁴ has been closed, the detent 14 will drop into the notch 17 and hold the cam shaft in the full running position of the motor A. Practically simultaneously with the engagement of the detent 14 in the notch 17, trigger 12 will trip the switch 11 and thereby deënergize the motor 6 and the electromagnet 9. This will cause the pump P to stop and the opening of the valve 8 due to the deënergization of the electromagnet 9 will neutralize the pressures on both sides of the piston of the fluid motor F. However the cam shaft will not return to the "off" position since it is held in the full running position by means of the detent 14. The motor A is thus caused to operate the pump B until no further work is required of this motor; that is until the height of the liquid in the tank C has raised so that the switch 13 will open the circuit to electromagnet 16. The deënergization of the electromagnet 16 will cause the detent 14 to be withdrawn from engagement in the notch 17 in accordance with its bias, and the cam shaft will be permitted to quickly return to the starting position (that shown in the drawings), in accordance with the bias of the spring 3. When this happens the operating fluid in the fluid motor F will circulate from the lower part of the cylinder of the fluid motor to the upper part through the by-pass 7 and the valve 8. The resistance to the flow of the fluid will be comparatively quite small and the cam shaft will move fairly quickly to the "off" position.

In case the speed of operation of the fluid motor was not properly adjusted for the proper acceleration of the motor A, the adjustment device 18 can be nicely regulated so as to permit more or less of the operating fluid to pass through the by-pass 7 when the pump P is operating to supply fluid under pressure to the lower side of the piston of fluid motor F, thereby giving a very accurate and easily adjusted regulation of the acceleration of the motor A.

In case the float operated valve 13 operates before the resistance switches S², S³ and S⁴ have been closed by the operation of their respective cams, and no further work is required of the electric motor A, for the time being, at least, the electromagnet 16, the motor 6 and the electromagnet 9 will be deënergized, thereby permitting the cam shaft to move to the "off" position, as above described.

It will be seen that my arrangement is entirely automatic in its operation since when the liquid in the tank C has dropped to the position at which the float attached to the switch 13 is operated to close the switch 13, the electric motor A will be automatically started as above described, and this operation will continue until the tank C has been filled to the height at which the switch 13 is automatically opened.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States is:

1. The combination with an electric motor and switch mechanism for controlling the same, of means for operating the switch mechanism comprising a fluid motor, an operating fluid by-pass around the fluid motor, a valve in the by-pass, and means operated responsively to the motor current for controlling the said valve.

2. The combination with an electric motor and switch mechanism for controlling the same, of means for operating the switch mechanism comprising a fluid motor, a source of fluid supply therefor, means for controlling the direction of operation and the speed of the fluid motor comprising valve mechanism, and automatic means for controlling the valve mechanism in accordance with the work required of the electric motor without varying the rate of discharge of fluid from the source.

3. The combination with an electric motor and switch mechanism for controlling the same, of means for operating the switch mechanism comprising a fluid motor, means for controlling the direction of operation and the speed of the fluid motor comprising an operating fluid by-pass around the fluid motor, and electromagnetic means energized responsively to the operation of said switch mechanism for controlling the by-pass.

4. The combination with an electric motor and switch mechanism for controlling the same, of operating means for the switch mechanism comprising a cam shaft, a fluid motor for operating the cam shaft, means for controlling the direction of operation and the speed of the fluid motor comprising an operating fluid by-pass around the fluid motor, and automatic means controlled responsively to the operation of the cam shaft for controlling the by-pass.

5. The combination with an electric motor and switch mechanism for controlling the same, of means for operating the switch mechanism comprising a fluid motor, a pump for supplying fluid under pressure to the fluid motor, an operating fluid by-pass around the fluid motor, a valve in the by-pass for controlling the speed and the direction of operation of the fluid motor, and automatic means operated responsively to the operation of the switch mechanism and in accordance with the work required of the electric motor for controlling the said pump and the said valve.

6. The combination with an electric motor and a plurality of separately operated switches for controlling the same, a cam shaft for operating the switches biased to a position at which the switches are opened, a reciprocating fluid motor for operating the cam shaft, a pump for supplying fluid under pressure to the fluid motor, an operating fluid by-pass around the fluid motor, an electromagnetically operated valve in the by-pass for controlling the speed and direction of operation of the fluid motor, and automatic means operated responsively to the work required of the electric motor and the current taken by the same for controlling the said pump and the said valve.

7. The combination with a switch mechanism for controlling an electric motor, of means for operating the switch mechanism comprising a fluid motor, a pump for supplying fluid under pressure to the fluid motor and means for controlling the operation of the fluid motor without affecting the operation of the pump.

In witness whereof, I have hereunto set my hand this 15th June, 1917.

JOHN EATON.